May 17, 1927.

P. ISRAELSON 1,628,779

POTATO CUTTER AND PLANTER

Filed June 23, 1923

Inventor
Peder Israelson
By his Attorneys
Merchant

Fig. 2

May 17, 1927.
P. ISRAELSON
POTATO CUTTER AND PLANTER
Filed June 23, 1923    4 Sheets-Sheet 3
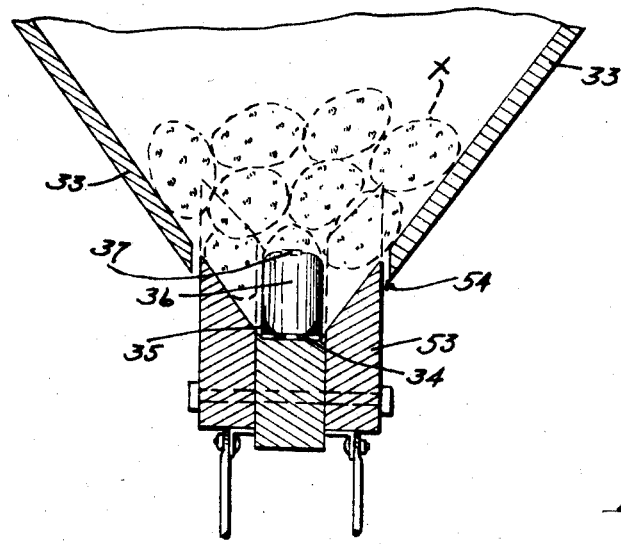
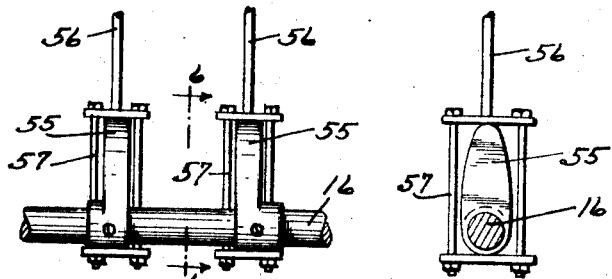
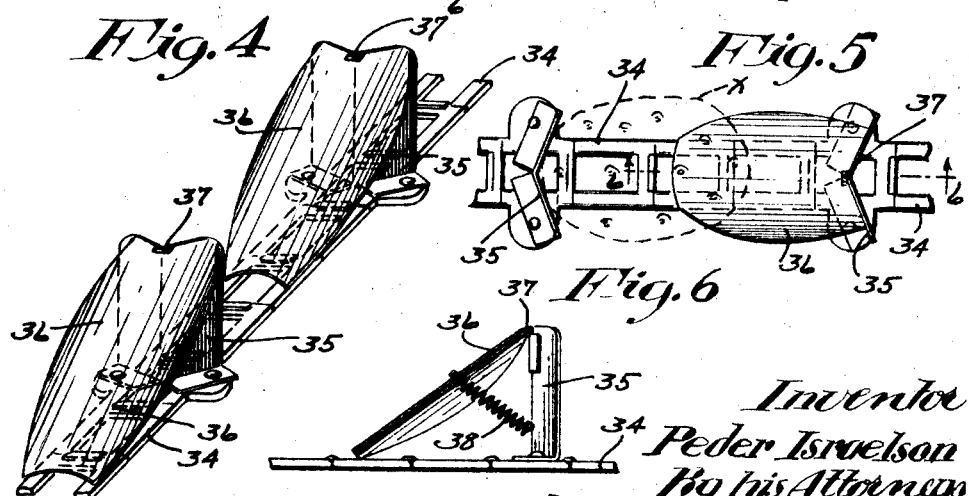
Inventor
Peder Israelson
By his Attorneys May 17, 1927.  
P. ISRAELSON  
1,628,779  
POTATO CUTTER AND PLANTER  
Filed June 23, 1923  
4 Sheets-Sheet 4
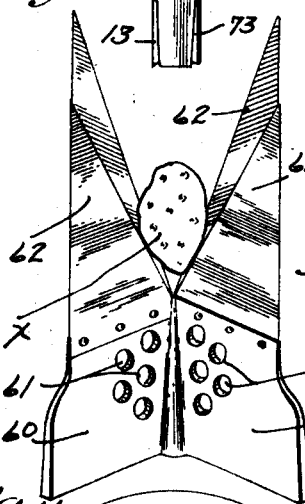
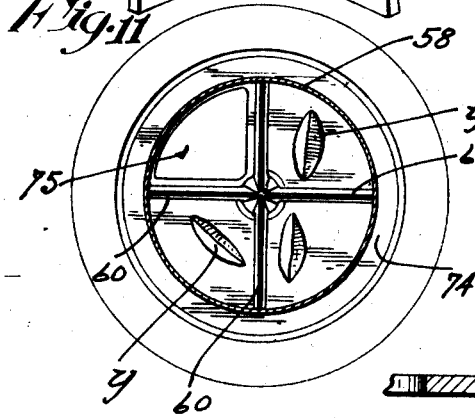
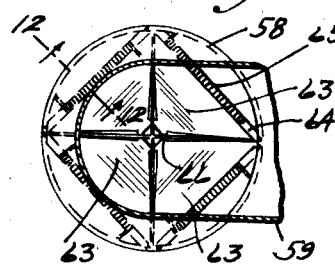
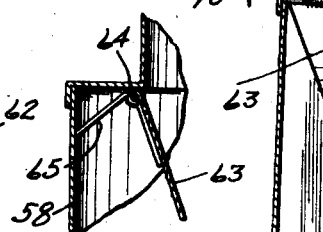
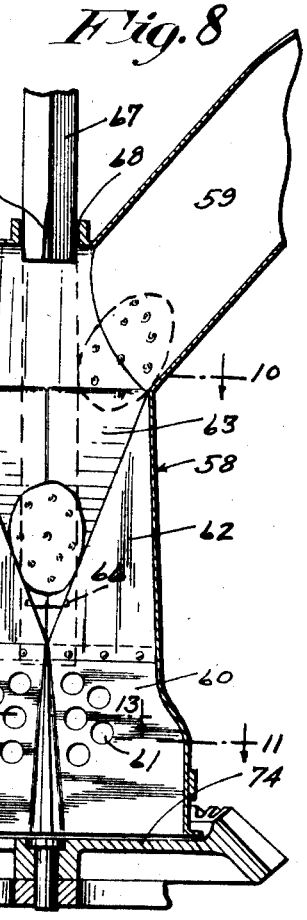
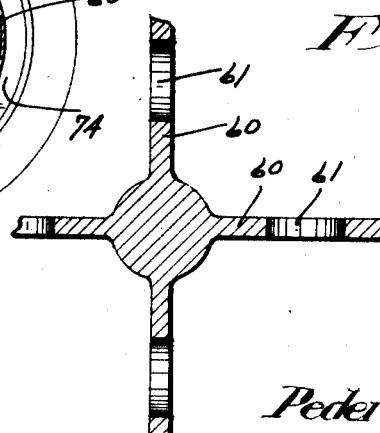
Inventor  
Peder Israelson  
By his Attorneys Patented May 17, 1927.

1,628,779

UNITED STATES PATENT OFFICE.

PEDER ISRAELSON, OF HILLMAN, MINNESOTA.

POTATO CUTTER AND PLANTER.

Application filed June 23, 1923. Serial No. 647,256.

My present invention relates to potato cutters and planters and has for its object to improve the same in the several particulars hereinafter noted.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 2 is a view in transverse vertical section taken on the line 2—2 of Fig. 1;

Fig. 3 is a detail view in section taken on the line 3—3 of Fig. 1, on an enlarged scale;

Fig. 4 is a fragmentary perspective view of the elevator;

Fig. 5 is a fragmentary plan view of the elevator indicating by broken lines a potato held by one of the scoops;

Fig. 6 is a detail view with some parts sectioned on the line 6—6 of Fig. 5;

Fig. 7 is a detail view with some parts sectioned on the line 7—7 of Fig. 3;

Fig. 8 is a detail view principally in section taken on the line 8—8 of Fig. 2;

Fig. 9 is a perspective view of the cutters and partitions removed from the casing;

Fig. 10 is a fragmentary detail view with some parts sectioned on the line 10—10 of Fig. 8;

Fig. 11 is a detail view with some parts sectioned on the line 11—11 of Fig. 8;

Fig. 12 is a detail view in section taken on the line 12—12 of Fig. 10, on an enlarged scale;

Fig. 13 is a fragmentary detail view in section taken on the line 13—13 of Fig. 8; and Fig. 14 is a perspective view of the plunger.

Figure 1:
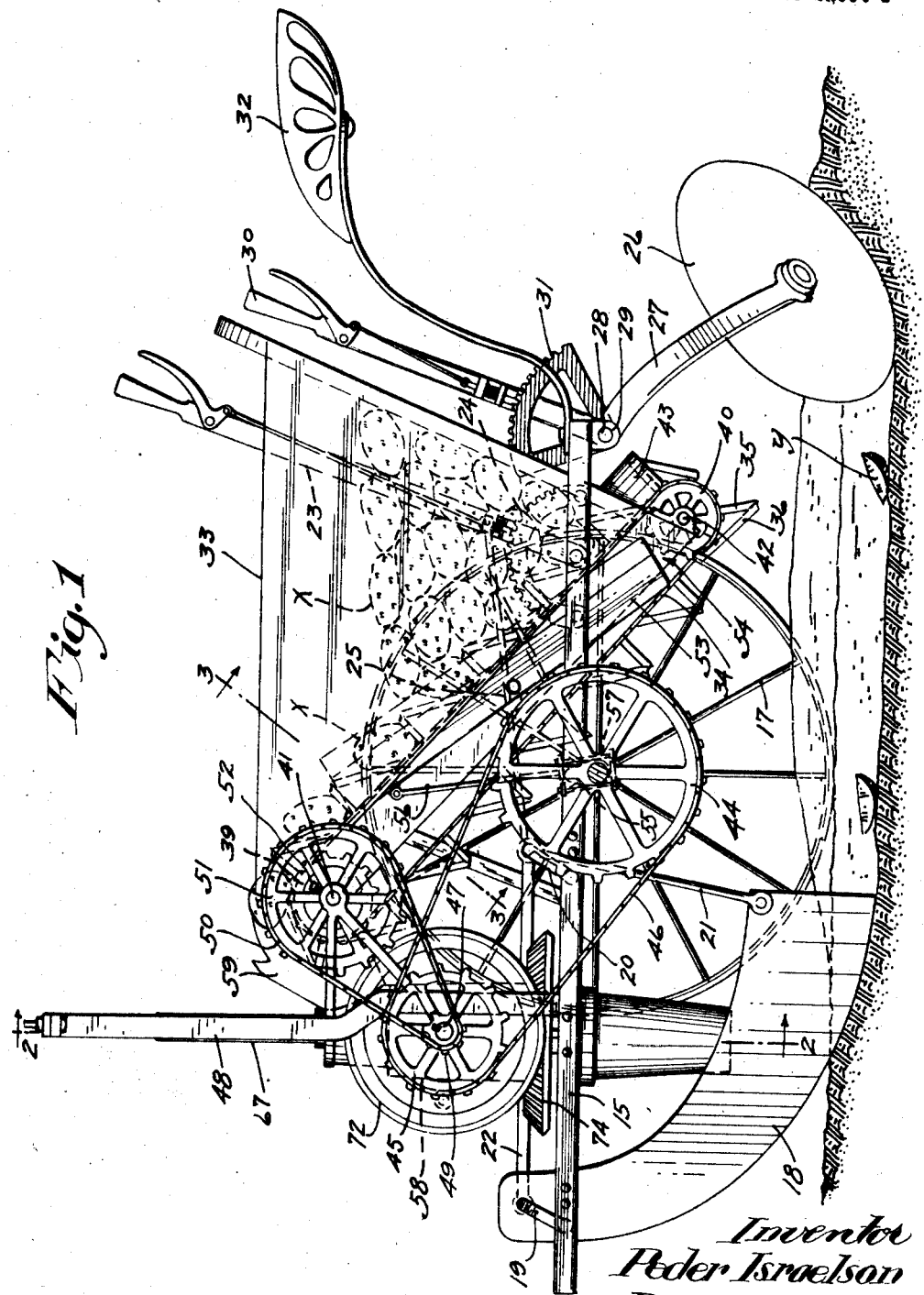
Fig. 1 is a side elevation of the invention with some parts removed and other parts sectioned.

The potato cutter and planter includes a rectangular horizontal frame 15 intermediately supported on an axle 16 to which is secured, for rotation therewith, a pair of large traction wheels 17.

Forward of the axle 16 is a furrow opener comprising a pair of forwardly and upwardly curved rearwardly diverging shoes 18, suspended at different elevations from front and rear transverse crank shafts 19 and 20 on the frame 15. The front end of the furrow opener is directly pivoted to the crank shaft 19, and the rear end thereof is held suspended by a pair of links 21 from the crank shaft 20. A link 22 connects the cranks of the shafts 19 and 20 for parallel and simultaneous rocking movement. To rock the shafts 19 and 20 there is provided a latch lever 23 having a co-operating segment 24 on the frame 15, and which lever is connected by a link 25 to the crank shaft 20.

Following the furrow opener 18 is a pair of oblique covering discs 26 journaled to a pair of forwardly and upwardly inclined arms 27 rigidly secured to a shaft 28 journaled in bearings 29 on the rear end of the frame 15. To raise and lower the covering discs 26 there is rigidly secured to the shaft 28 a latch lever 30 having a co-operating segment 31 on the frame 15. A seat 32 for the operator is secured to the frame 15.

Seed potatoes $x$ are carried in a hopper 33, mounted on the frame 15 rearward of the axle 16, which has a forwardly inclined narrow, flat bottom, and sides that diverge therefrom. The seed potatoes $x$ are carried, one at a time, up the inclined bottom of the hopper 33 by an endless elevator 34 in the form of a sprocket chain having secured to certain of its links scoops 35. These scoops 35 extend perpendicular in respect to the elevator 34, are V-shaped in cross-section, and the wings thereof diverge in the direction of the travel of the elevator to hold potatoes thereon, as shown by broken lines in Fig. 5.

To prevent more than one potato from being carried by each scoop 35, there is attached to said scoops rearwardly extended deflectors 36. These deflectors 36 are hinged at 37 to the tops of the scoops 35, and are yieldingly held with their lower rear ends in contact with the elevator by coiled springs 38. Said deflectors 36 are curved in cross-section toward the elevator to prevent the potatoes from resting thereon.

The elevator 34 is arranged to run over front and rear sprocket wheels 39 and 40, respectively, the former of which is secured for rotation with a driving shaft 41, and the latter of which is secured to an idle shaft 42, both of which are journaled in bearings on the hopper 33. The sprocket wheels 39 and 40 support the elevator 34 so that its upper section travels through the hopper 33 on the flat inclined bottom thereof. The elevator 34 enters the hopper 33 through a passageway 43 in the back wall thereof, and which passageway is of such length so that one of the scoops 35 always closes the same so as to prevent the escape of potatoes in the hopper therefrom.

To drive the elevator 34 there is secured to the axle 16 a large gear 44 over which and an aligned relatively small sprocket wheel 45 runs a sprocket chain 46. The sprocket wheel 45 is secured to a short idle shaft 47 journaled in a bearing on one of the uprights of a transverse yoke-like supplemental frame 48 rigidly secured to the frame 15 between the two rock shafts 19 and 20. Also mounted on the shaft 47, outward of the sprocket wheel 45, is a relatively small sprocket wheel 49 rigidly secured to the sprocket wheel 45 for rotation therewith. A sprocket chain 50 runs over the sprocket wheel 49, and a relatively large sprocket wheel 51 on the shaft 41, and which sprocket wheel completes the driving connections from the traction wheels to the elevator 34. The sprocket wheel 51 is secured by a set screw 52 to the shaft 41 for circumferential adjustment thereon, and which adjustment permits the elevator 34 to be advanced or retarded for a purpose that will presently appear.

To agitate the potatoes $x$ in the hopper 33 and thereby always insure a constant supply to the scoops 35 during their travel through the hopper 33, I provide a pair of intermediately pivoted agitating bars 53 mounted in longitudinal slots 54 formed in the diverging sides of the hopper 33, one on each side of the bottom thereof, as best shown in Fig. 3.

The upper edges of the agitating bars 53 are beveled to correspond to the sides of the hopper 33 and form sections thereof. The agitating bars 53 are rocked on their pivotal connections, during the travel of the machine, by a pair of eccentrics 55 connected thereto by a pair of connecting rods 56. Said eccentrics are secured to the axle 16, and said connecting rods have one of their ends pivoted to the forward ends of the agitating bars 53, and their other ends are connected to the eccentrics 55 by eccentric straps 57 comprising upper and lower plates connected by four bolts.

The potatoes $x$ picked up by the scoops 35 are successively delivered into the top of an open bottom cylindrical casing 58 through a downwardly inclined delivery spout 59. The casing 58 is supported by and within the supplemental frame 48, and has in its lower end portion four radial partitions 60 which divide said casing into four segmental compartments. These partitions 60 are wedge-shaped in vertical section and each thereof is provided with a plurality of air holes 61. Rigidly secured to the upper edges of the partitions 60 is a potato cutter comprising radial knives 62 which form extensions of said partitions and have oblique cutting edges which diverge from the axis of the casing 58 to the side walls thereof.

Converging centering plates 63 are hinged at 64 to the casing 58 at the upper ends of the cutters 62 and are yieldingly held by springs 65 at substantially the cutting edges of said knives. Stops 66 on the lower or free ends of the centering plates 63 engage the knives 62 and limit the swinging movement of said centering plates under the action of the springs 65 and normally hold said centering plates, as previously stated. As the potatoes enter the casing 58 from the discharge spout 59, the same are centered by the plates 63 on the cutting edges of the knives 62.

To force the potatoes onto the cutting edges of the knives 62 and thereby quarter the same, I provide a reciprocating plunger 67 which is square in cross-section and mounted in a correspondingly formed guide 68 in the top of the casing 58 above the discharge spout 59. This plunger 67 is carried by a crosshead 69 mounted to slide on guides 70 on the supplemental frame 48. To raise and lower the crosshead 69 and thereby reciprocate the plunger 67, said crosshead is provided with a depending link 71 eccentrically pivoted to a bevel gear 72 on the shaft 47. The lower end of the plunger 67 is bifurcated at 73 to afford clearance for the knives 62 during its extreme lowermost travel which is such as to force the potatoes past the knives 62 and thereby completely sever the same.

Figure 2:
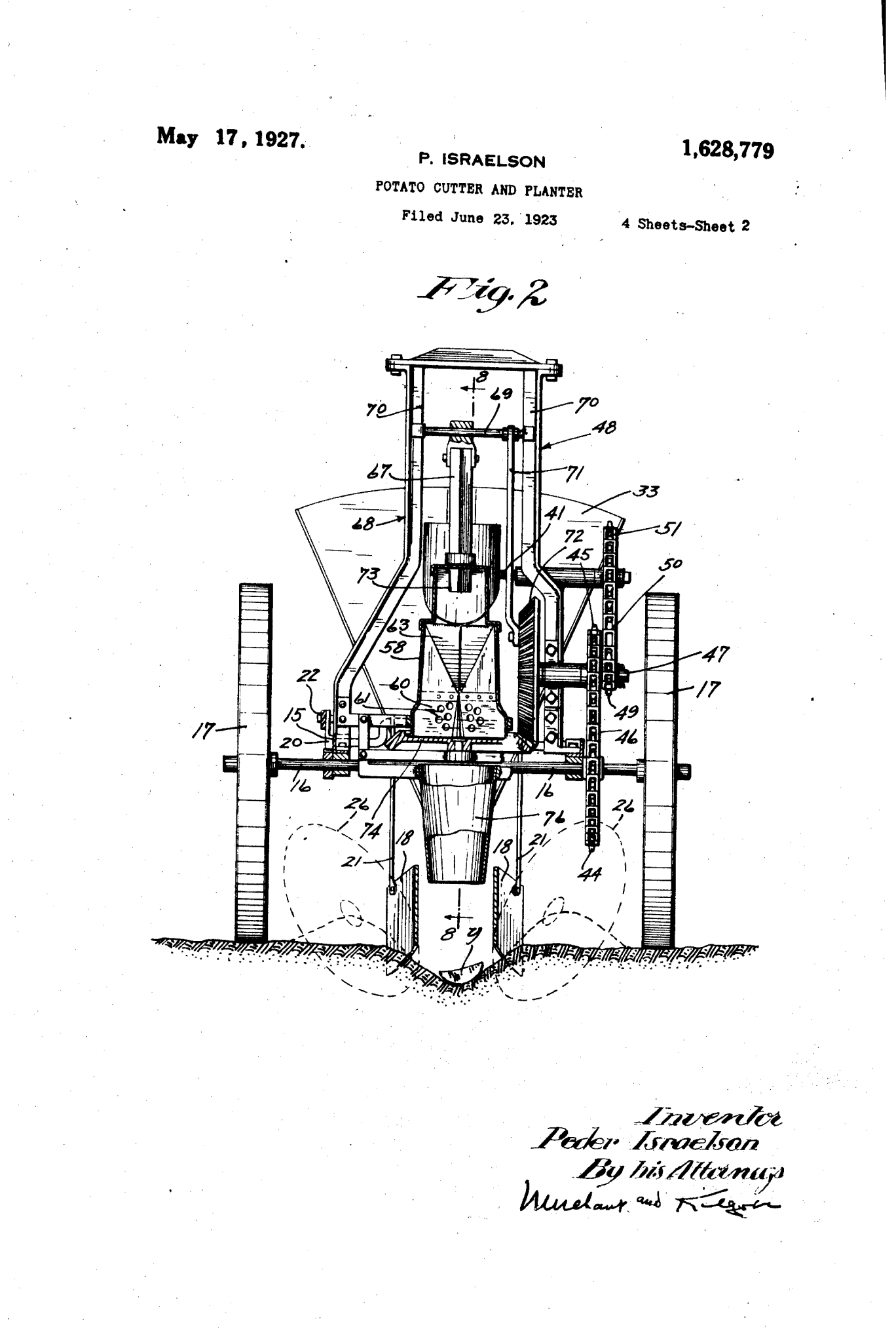

The spacing of the scoops 35 is such that when the plunger is down and forcing a potato onto the knives 62, a second potato is discharged into the discharge spout 59 and held, as indicated by broken lines in Fig. 8, by the projected plunger 67, until said plunger is again raised to release the second potato and allow the same to drop onto the knives 62 and be positioned by the centering plates 63. The open bottoms of the compartments in the casing 58 are normally closed by the web of a large bevel gear 74 which meshes with the gear 72 and is provided with a discharge opening 75 which is successively brought into registration with the several compartments during the rotation of the gear 72 to release the quartered potatoes therein. This gear 74 is journaled on a part carried by the supplemental frame 48. As the quartered potatoes successively drop through the opening 75 in the gear 74, the same are guided by a spout 76 between the shoes of the furrow opener and into the furrows, as best shown in Fig. 2.

The operation of the above described potato cutter and planter may be briefly stated as follows:

The agitated potatoes in the hopper 33 are carried upward by the elevator 34 and delivered one at a time into the discharge bottom 59 by the scoops 35. The spacing of the scoops 35 is such that while one potato is being cut, a second potato is delivered into the discharge spout 59 and held by the projected plunger 67 ready to be released as soon as said plunger is released. The time at which potatoes may be discharged into the spout 59 by the scoops 35 in respect to the reciprocations of the plunger 67 may be varied by turning the sprocket wheel 51 on the shaft 41 to either advance or retard the elevator. This adjustment is highly important for the reason that certain draft animals walk faster than others.

During the cutting of the potatoes, under the action of the plunger 67, the same are liable to stick to the sides of the partition, due to the cutting action and the sap therein, and thereby intercept the feeding action of the quartered potatoes to the open furrow. The wedge-acting partitions 60 and the air holes 61 therein overcome this tendency of the cut potatoes to stick to said partitions and cause the same to instantly drop, when cut, on the rotating gear 64 and be scraped therefrom by said partitions into the discharge opening 75 as the same is successively brought into registration with the several compartments.

The centering plates 63 will be opened up by the pressure of the potatoes thereon when forced onto the knives 62 by the plunger 67 but will immediately assume their normal position under the action of the springs 65, as soon as the plunger 67 is retracted, to center the next dropped potato.

The distance between the dropped potato quarters may be varied, at will, by substituting different sized gears for the gears 45 and 49 to change the speed of the gear 74, the reciprocations of the plunger 67, and the travel of the elevator 34.

What I claim is:

1. A potato cutter comprising an upright fixed casing having an open bottom and a plurality of radial partitions dividing said casing into circumferentially spaced compartments, a plurality of knives forming top extensions on said partitions, the inner edges of said knives being sharp and in upwardly diverging relation in respect to the axis of the casing, V-shaped depending centering plates having their tops hinged at the top of the casing for horizontal swinging movement between the knives, yielding means normally holding the centering plates pressed inward in downwardly converging relation normally closing said compartments, said casing having a contracted top extension opening into the casing inward of the hinged upper ends of the centering plates, a spout arranged to deliver potatoes through the side of the casing extension onto the centering plates, a reciprocating plunger working in a passageway in the top of the casing extension and held thereby against rotation and axially aligned with the casing for forcing a potato held by the centering plates onto the knives, and a rotatable bottom member for the casing having an escape passageway arranged to be successively brought into registration with the open bottoms of the compartments.

2. The structure defined in claim 1 in which said partitions are wedge-shaped in vertical section and have a multiplicity of air holes for the release of the cut potatoes at the limit of the working stroke of the plunger.

In testimony whereof I affix my signature.

PEDER ISRAELSON.